(12) United States Patent
Martin

(10) Patent No.: US 7,382,242 B2
(45) Date of Patent: Jun. 3, 2008

(54) METHOD AND RECEIVER FOR BLOCKING A RUNAWAY DIALER AT A LOCAL SECURITY SYSTEM

(75) Inventor: Christopher D. Martin, Plainview, NY (US)

(73) Assignee: Honeywell International, Inc., Morristown, NJ (US)

( * ) Notice: Subject to any disclaimer, the term of this patent is extended or adjusted under 35 U.S.C. 154(b) by 93 days.

(21) Appl. No.: 11/089,768

(22) Filed: Mar. 25, 2005

(65) Prior Publication Data

US 2006/0214782 A1    Sep. 28, 2006

(51) Int. Cl.
*G08B 23/00* (2006.01)
(52) U.S. Cl. .................. 340/500; 379/210.02
(58) Field of Classification Search ............... 340/500, 340/540, 521, 514; 455/550.1, 418, 422.1; 379/210.02, 196, 207.13, 67.1, 142.02, 142.01, 379/142.07, 93.09, 210.03
See application file for complete search history.

(56) References Cited

U.S. PATENT DOCUMENTS 5,467,388 A * 11/1995 Redd et al. ............ 379/210.02
6,359,970 B1 * 3/2002 Burgess ..................... 379/67.1
6,418,212 B1 * 7/2002 Harrison et al. ............ 379/189
6,453,019 B1 * 9/2002 Latter et al. ............... 379/67.1
6,496,569 B2 * 12/2002 Pelletier et al. .......... 379/88.21
6,553,110 B1 * 4/2003 Peng ...................... 379/210.03
6,701,160 B1 * 3/2004 Pinder et al. ............ 455/550.1

* cited by examiner

*Primary Examiner*—Anh V. La
(74) *Attorney, Agent, or Firm*—Scully, Scott, Murphy & Presser, P.C.

(57) ABSTRACT

A monitoring receiver having a memory, a control section, a counter and transmitting and receiving section. An operator can input a blocking time period, blocking criteria and a blocking threshold into the receiver. The control section causes a comparator to compare the blocking threshold with a counted number of times a local security systems contacted the monitoring receiver. The monitoring receiver blocks the transmissions when the counted number exceeds one of the blocking threshold values. The monitoring receiver generates a list of all local security systems that are being blocked which is stored in memory and transmitted to an automation system or a remote computer.

27 Claims, 5 Drawing Sheets

METHOD AND RECEIVER FOR BLOCKING A RUNAWAY DIALER AT A LOCAL SECURITY SYSTEM

FIELD OF THE INVENTION

The invention relates generally to a monitoring system including a central monitoring station having a plurality of receivers that receive periodically updated information from a number of different security systems at different locations. More specifically, the invention relates to a security system receiver capable of blocking transmissions from the different security systems at different locations.

BACKGROUND OF THE INVENTION

Security systems, such as for homes and businesses, have become commonplace as people seek to protect themselves and their property. A security system includes any life, safety and property protection system. The security system typically includes a central control panel that communicates with a number of sensors via a wired or wireless path. The control panel has the ability to notify local emergency services and/or a remote monitoring station of an alarm condition via a telephone dialer to the remote monitoring facility or local emergency services. A communication network device, such as a modem, allows the control panel to send and receive information via a communication link to a communication network. The communication network is usually a telephone network and the communication link is a telephone line, however, the control panel can also send and receive information via a computer network, such as the Internet. The computer network may include a DSL or cable modem, and a network interface card, for example. In addition, a dial-up telephone connection may be used. Other communication paths such as long-range radio or a cellular telephone link have been used. The dialer is typically hardwired to the control panel and activated by the control device.

The central monitoring station is staffed with operators to monitor incoming communications and to determine when an alarm is set by a monitored security system. The operator contacts emergency services such as fire or police personnel in the appropriate municipality by telephone to report the alarm.

In response to a received message, the central monitoring station processes the message and performs the necessary response. The messages from the respective security systems may include identifiers that identify the security systems. Generally, the remote facility can maintain data regarding the identity of one or more security systems that are to be notified when a specified occurrence is detected at one or more other security systems.

The central monitoring station includes receivers and transmitters for communicating with different security systems via one or more networks. The receivers receive messages via a communication link from the local individual security systems. Each receiver is connected to an automation system. The automation system is typically an automation computer. The receivers are connected to the automation computer by an automation computer port.

The control panel at the local security systems periodically transmits status information to the receiver at the central monitoring station. These periodically updated transmissions are called status reports. The status reports typically occur at a predetermined interval, which can be controlled by a configuration computer located at the central monitoring station. Additionally, the local security system can call the receiver periodically to transmit other types of information. The control panel transmits both the status (test) reports and the calls to the receiver using a dialer in the control panel. However, sometimes the dialer malfunctions and continuously transmits calls and reports to the receiver. This causes an increased flow of traffic into the receiver and into the automation system.

Therefore, there is a need to prevent this increase in the flow of traffic in the case where the dialer is malfunctioning or in the case where the local security system transmits information, data or calls the receiver at a higher rate then expected.

BRIEF SUMMARY OF THE INVENTION

Therefore, it is an object of the present invention to provide a security receiver at a central monitoring station having the capability of blocking a transmission from a local security system in the case where a dialer at the local security system has malfunctioned by contacting the receiver excessively.

To achieve the foregoing and other objects and in accordance with the purpose of the present invention, as embodied and broadly described herein, a monitoring receiver includes a timer for counting down a blocking time period and a counter for counting transmissions that are received from the local security system. The receiver further includes a comparison means for comparing a number of times that a local security system contacts the receiver with a predetermined threshold value. The threshold value is a blocking threshold that is programmed into the receiver. The receiver blocks the transmission from the local security system when the number of times that the local security system contacts the receiver is greater than the threshold value within the blocking time period. The receiver blocks the contact using a blocking means.

The monitoring receiver further includes a means for selecting at least one blocking criteria. The blocking criteria can be a number of calls or a number of reports. The receiver further has a means for selecting at least one blocking threshold value.

The blocking means sets a blocking flag when the number of times that the local security system contacts the receiver is greater than the threshold value within the blocking time period. This blocking flag is transmitted to a receiving and transmitting section of the receiver which causes the receiving and transmitting section to block the transmission, signal or contact.

The receiver can further include a second timing means for counting down a block period which is a time period wherein the security receiver blocks transmissions from the local security systems.

In another aspect of the invention, a monitoring system comprises a plurality of receivers, each having a receiving and transmitting section for receiving and transmitting signals from and to a plurality of local security systems and a control section for processing the received signals. The monitoring system further includes a monitoring receiver configuration computer connected to each of the plurality of receivers. The monitoring system receiver configuration computer includes a first timer for counting down a blocking time period, a counter for counting a number of transmissions received by the receiver from each of the plurality of local security systems, a comparison means for comparing the counted number with one of a plurality of blocking threshold values, which is stored in a storage means, and a control section for transmitting a blocking signal to the receiver based upon the comparison.

The monitoring system has a means for selecting at least one blocking threshold, at least one blocking criteria, a blocking time period and a block period and is located in the monitoring receiver configuration computer. One of the plurality of receivers block transmissions from one of the plurality of local security systems when the receiver receives the blocking signal from the monitoring system receiver configuration computer.

A corresponding method of blocking transmission from a plurality of local security systems is provided.

The above and other features of the invention, including various novel details of construction and combinations of parts, will now be more particularly described with reference to the accompanying drawing and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
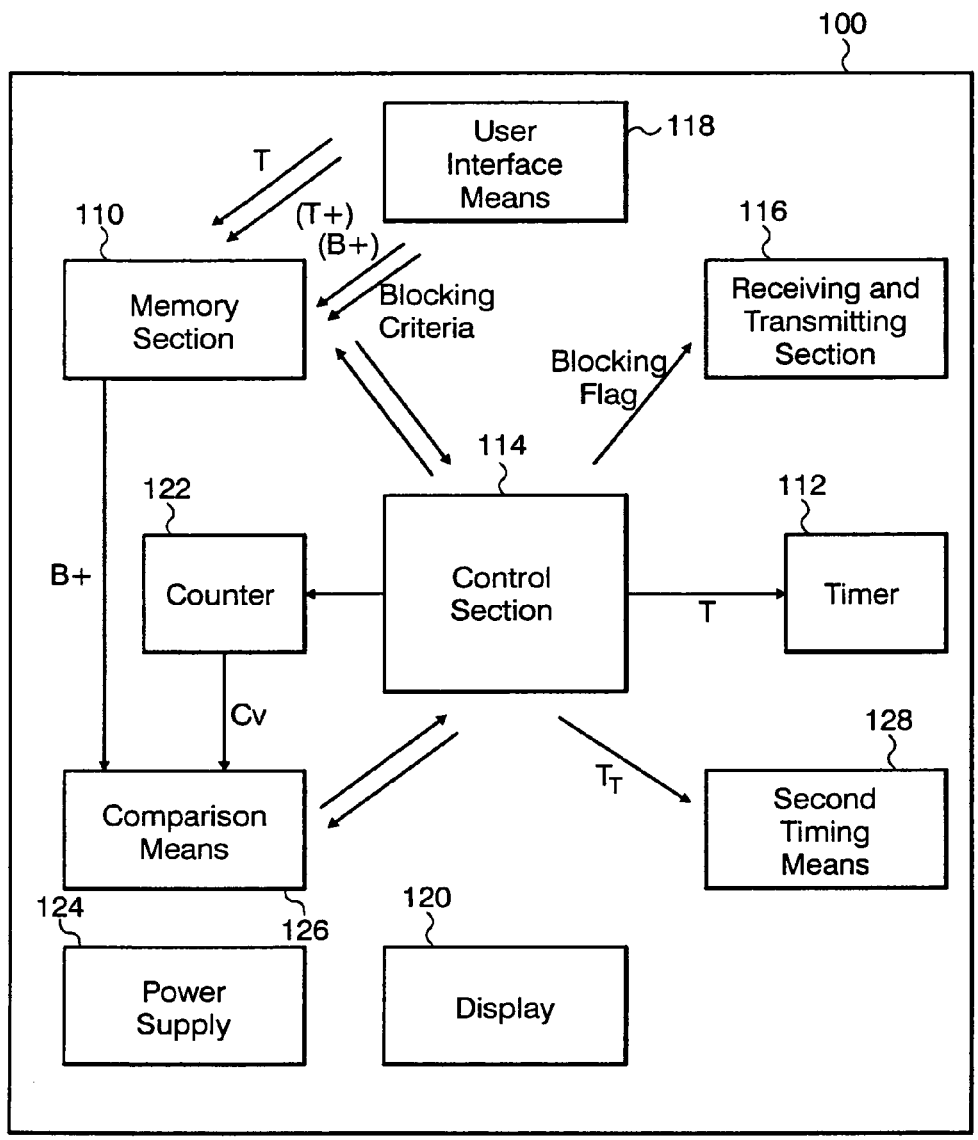
FIG. 1 illustrates a monitoring receiver according to the present invention.

FIG. 1 illustrates a monitoring receiver according to the present invention. To begin with, structure and operation distinctions of the present invention will be described. In the preferred embodiment, the security system receiver is capable of controlling transmission functions of a local installed security system, such that the transmission is blocked in the case of a runaway dialer or a continuously repeated transmission.

In FIG. 1 the monitoring receiver 100 comprises a memory section 110, a timer 112, a control section 114, receiving transmitting section 116, a user interface means 118, a display 120, a power supply 124, a counter 122 and a comparison means 126.

The control section 114 controls the overall processing for all user-inputted commands, pre-programmed instructions stored in said memory section 110, such as the blocking program according to the invention. The display 120 displays a menu options, user inputted commands and information, such as subscriber numbers and local security system identifiers, blocking criteria and blocking threshold values. The memory 110 is for storing pre-programmed instructions such as the blocking program according to the invention, subscriber numbers and local security system identifiers, blocking criteria, and blocking threshold values.

The user interface means 118 can be a keyboard, alpha numeric keypad, or a touch panel which function to input data concerning blocking the local security system transmission, blocking criterias and timing thresholds for blocking transmissions from said local security systems.

The receiving and transmitting section 116 receives and transmits signals to and from a plurality of local security systems and is controlled by said control section 114.

The timer 112 is used to time a blocking time period which is selected by an operator at the central monitoring station and used to determine whether a local security system should be blocked.

The receiver 100 can also have a second timing means 128 for timing how long a local security system should be blocked.

The counter 122 is used to count a number of times a local security system transmits to the receiver. A transmission can be a call to the receiver 100 and/or a report. The power supply section 124 is used to distribute the power from a power source to each part of the receiver 100.

In operation, the operator inputs at least a blocking time period, at least one blocking criteria, and at least one blocking threshold through the user interface means 118. Accordingly, the operator is capable of blocking multiple transmissions from the local security systems in the case where the local security system calls or reports into the receiver excessively during a selected period of time as a result of a malfunction in the dialer. A runaway dialer is a dialer in a local security system that continues to call or send reports to a receiver beyond what is normal due to a problem at the site or with the security system. The receiver can block the local security system which will reduce the flow of traffic into the receiver. While the receiver 100 is blocking the local security system, the display 120 can indicate that a local security system is being blocked, as well as if there is a specified block time period. At the same time, the control section 114 can transmit a message to the automation system such that the operator can send a repairman out to the local security system to fix the dialer.

If the operator does not enter a specific block period for the local security system, the receiver 100 will block all transmissions from the local security system for an indefinite period of time.

Next, an example of operation of the first embodiment of the present invention will be described.

Figure 2:
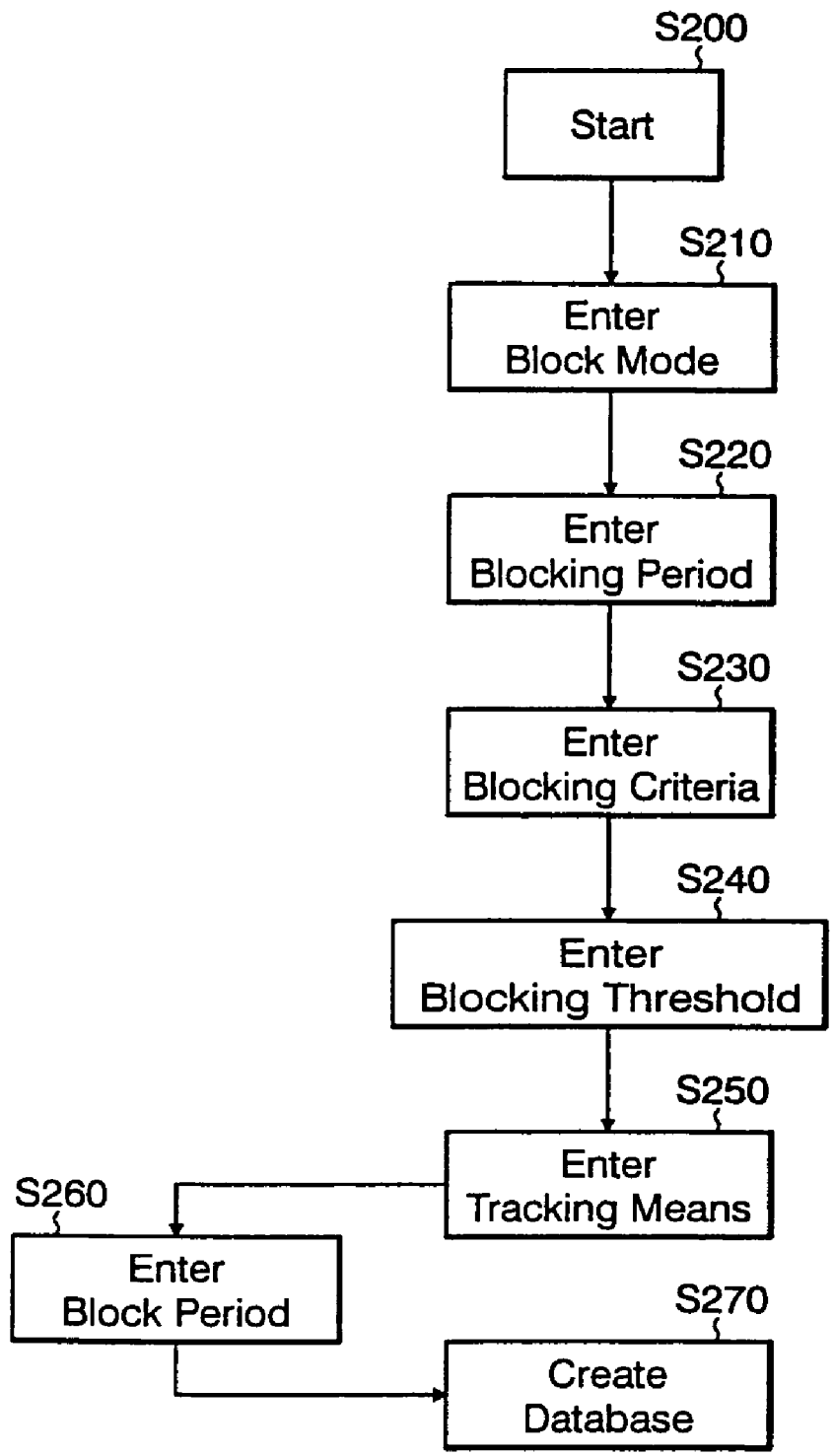
FIG. 2 is a flow chart showing the sequence of programming a receiver to block a local security system according to the first embodiment of the invention.

FIG. 2 is a flow chart showing the sequence of programming a receiver 100 to block a local security system if certain blocking criteria is met. The process begins at step 200. At step 210, the operator enters the blocking mode by using the user interface means 118 to navigate through a general operation menu tree visible on the display 120. Once in blocking mode, the receiver 100 will prompt the operator to enter a blocking time period, at step 220. The blocking time period is a time increment in minutes and can be a number between 1-N minutes. The timer 112 will countdown the blocking time period. In blocking mode, the blocking time period will be stored in the memory 110 of the receiver 100.

After the blocking time period has been entered and stored, a blocking criteria is entered in step 230. The receiver 100 has a plurality of blocking criteria programmed into its memory 110. For example, the receiver can block the local security system by a number of reports or kiss offs within the blocking time period or by number of calls within a period of time.

The receiver 100 will prompt the operator to select which blocking criteria the receiver 100 should use to determine if a local security system should be blocked. The operator will select at least one blocking criteria by using the user interface means 118. This section will be stored in memory 110.

After at least one blocking criteria has been selected, the operator will be requested to input a blocking threshold value indicating the level of the selected blocking criteria that will be tolerated at step 240, i.e., the level in which a greater number of calls or reports would trigger the receiver to block or ignore the local security system. For example, if the operator selects as the blocking criteria the number of calls within a time period, the blocking criteria threshold would be a number value for the number of calls ranges from 1-XX in the blocking time period, e.g., 10 or more, 20 or more, 30 or more, etc.

Further, if the operator selects as the blocking criteria the number of reports (kiss off) within a time period, the blocking criteria threshold would be a number value for the number of reports ranges from AA-BB in the blocking time period, e.g., above 50, above 75, above 100. The blocking threshold value will be stored in memory 110 with the blocking criteria.

The operator will program how to track a call to determine if the local security system is a runaway dialer and to block a call from continuing once determined to be a runaway dialer at step 250. Available options are by caller ID number (identifier), ANI, or subscriber number. The operator will select the tracking means using the user interface means 118 and this selection will be stored in memory. A list of tracking options will be displayed on the display 120.

After the blocking time period, blocking criteria, blocking threshold, and tracking means has been entered into memory 110, the control section 114 creates at least one database or data table in memory 110 from the entered information according to the blocking program stored in memory, at step 270.

An example of the data table is depicted below.

| TRACKING MEANS | BLOCKING CRITERIA | BLOCKING THRESHOLD | COUNTER VALUE | BLOCKING FLAG VALUE |
|---|---|---|---|---|
| | | | | |

In the first column of the database or data table is the tracking means, i.e., subscriber number or identification number.

The second column is the blocking criteria. The third column is the blocking threshold value. The fourth column is the number of times the local security system contacts the receiver 100. A contact is either a call, a number of reports. The last or fifth column is the result of the comparison between column 4 and column 3. If the value in column 4 is greater than column 3 the value in column 5 will be "1", if not then the value will be "0". This is a blocking flag. A database or data table is created in memory for each blocking criteria selected. However, it is within the scope of the invention to create one database or data table having all of the blocking criteria, all call information, all report information and blocking thresholds. It is further within the scope of the invention to include the blocking time period in the database. It is also within the scope of the invention to modify the order of the columns in the table as the above example is provided for demonstrative purposes only.

The database is used such that the control section 114 can determine if the local security system should be blocked. Specifically, every time the new local security system contacts the receiver 100, the unique identification number is added to the first column tracking means, i.e., subscriber number or identifier. The value in the counter is set to 1. If a local security system has already contacted the receiver 100, the control section 114 will match the unique identification number with a number in column 1 on the database and increment the value in the counter by 1.

Figure 3:
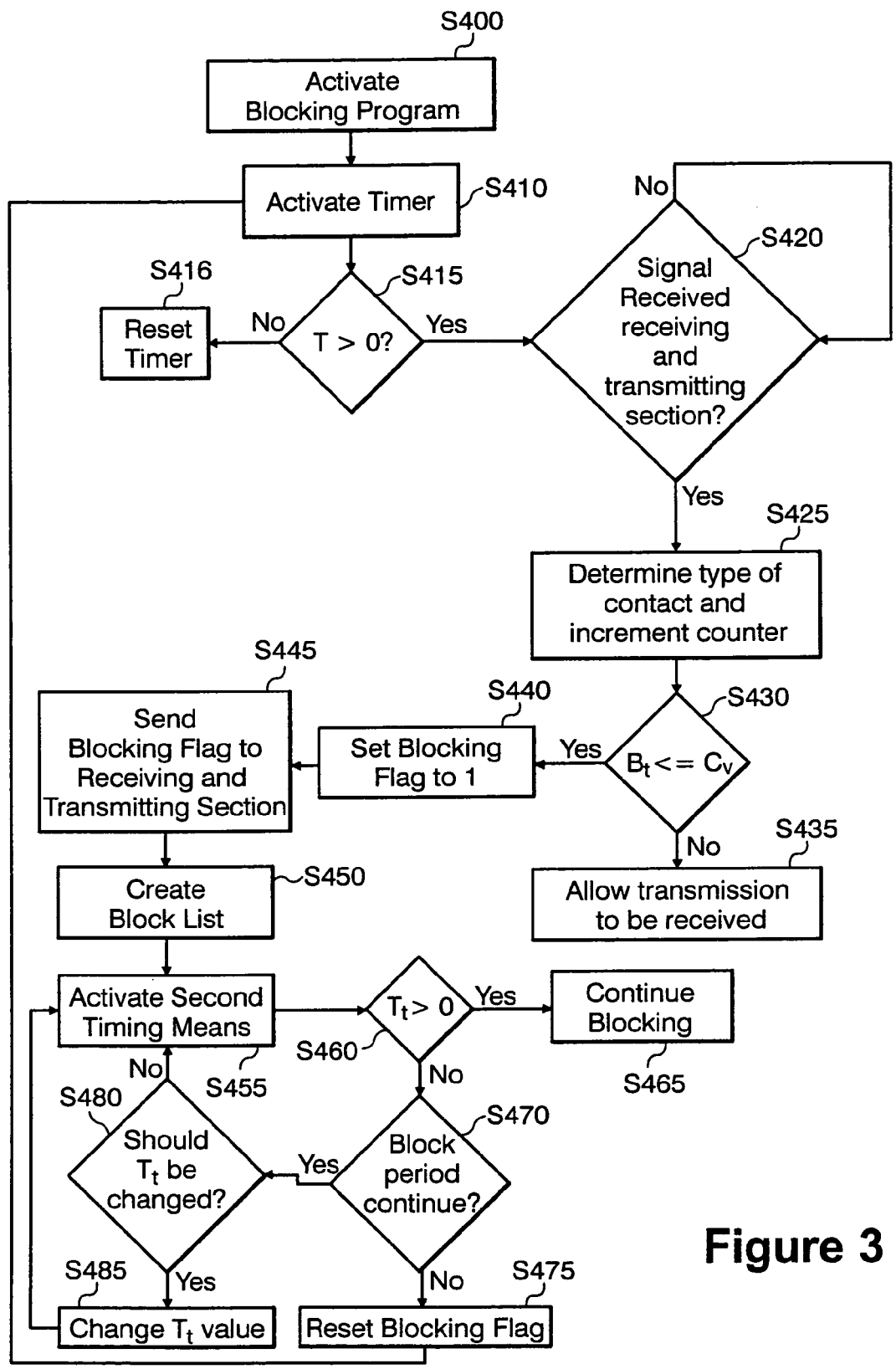
FIG. 3 illustrates the sequence of steps to block a local security system according to the first embodiment of the invention.

Next, operation of the blocking process will be described according to the first embodiment of the invention. FIG. 3 illustrates the sequence of steps to block a local security system. At step 400 the blocking program is activated. Once all of the blocking information such as blocking criteria, blocking threshold values, blocking time period, and tracking means has been entered into memory 100, the blocking program instructs the control section 114 to activate the timer 112. At step 410 the timer 112 counts down the blocking time period.

The control section 114 checks to see whether or not the timer 112 has finished counting down the blocking time period at step 415. If the timer has not finished counting down the blocking time period (T>0), then the control section 114 will determine if a signal has been received by the receiving and transmitting section 116 at step 420. If the blocking time period T=0, then the operator can reset the timer, at step 416.

Each time the local security system contacts the receiver 100 the local security system transmits data to the receiver 100 via the receiving and transmitting section 116.

The control section 114 checks the receiving and transmitting section 116 for a transmission from the local security system. The control section 114 will then determine the type of contact, at step 425. Specifically, the control section 114 will determine if the contact was a call or a report. Depending on the blocking criteria, the control section will cause the counter to increment. For example, if the blocking criteria is a number of calls within a predetermined blocking time period, and the control section 114 determines that the contact was a call, then the control section will cause the counter 122 to increment by 1 (column 4 of the database). If no transmission is received, the receiver 100 will wait for a transmission, remaining at step 420.

At step 430, the control section 114 will determine if the blocking threshold value has been reached. The blocking programming will compare the blocking threshold value with the value of the counter 122. This will be accomplished by using a comparison means 126. If the blocking threshold value (B+)>than the value of the counter (Cv), then the control section 114 will allow the receiver to process the call, at step 435.

If the blocking threshold value (B+)≦the value of the counter (Cv), then control section 114 will cause the receiver 100 to block or ignore the call.

The blocking program then will instruct the control section 114 to set a blocking flag to have a value of 1, at step 440. The blocking flag is a control signal which is sent to the receiving and transmitting section 116 and instructs the receiving and transmitting section 116 to block a transmission. If the blocking flag has a value of 1, then the local security system is blocked. The control section 114 will transmit the blocking flag to the receiving and transmitting section 116 as a signal to block the local security system, at step 445. The receiver 100 will immediately issue a kiss off tone and disconnect the local security system. If more than one blocking criteria has been selected, the comparison means 126 will compare each blocking threshold value ($B_{+1}$ ... $B_{+N}$) with a value of the counter ($C_{v1}$ ... $C_{vN}$) to determine if any or all of the blocking threshold values have been exceeded.

With reference to the example data table, if column 4 is >=column 3 then the receiver 100 will block the local security systems transmissions. The receiver 100 can block transmission from the local security system if one of the blocking threshold values has been exceeded. It is also within the scope of the invention to only block the transmission if all of the blocking thresholds have been exceeded.

The control section will create a list of all local security systems which are blocked, i.e., blocking flag set at 1, at step 450. This list is stored in memory.

This blocking list can be displayed on display 120 at any time by the operator. Furthermore, it is within the scope of the invention that the receiver includes a notification means which notifies the operator each time a blocking flag is set to 1. This notification means can be a signal such as a sound, light, through a speaker, a relay device, or a light on the display. Furthermore, the notification means or signal can be transmitted to the automation computer or a printer such the operator can be notified.

Additionally, the blocking list can be outputted to the automation computer or a printer. This will enable the operator to send a repairman out to the local security system to fix the dialer.

The timer 112 can also be displayed in the display 120 to the operator to check to see whether the timer 112 has finished counting down the blocking time period or not.

At step 260, as depicted in FIG. 2, the operator can enter a block period which is a period of time that the receiver 100 will block or ignore a local security system. A block period ($T_+$) is a time that can be a time been 1-N. If no block period ($T_+$) is entered a default time period will be used. The default period is an infinite time period. In other words, the receiver will block transmission from the local security system until the operator resets the receiver 100 to stop blocking the local security system. The blocking signal is reset when the dialer at the local security system is fixed. A second timing means 128 is used to countdown the block period ($T_+$).

The block period ($T_+$) will be stored in the memory section 110.

At step 455, the control section 114 will activate the second timing means 128 to start counting down the block period ($T_+$). The receiver 100 will continue to block transmissions from the local security system as long as the time remaining in the block period is greater than zero ($T_+>0$)

In the blocking program, when transmissions are blocked, the display 120 can display information indicating that transmissions from a local security system are blocked, as well as the remaining block period ($T_+$).

The remaining block time can also be transmitted to the automation computer or outputted on a printer.

The control section will check to see whether the second timer has finished counting the block period or not, at step 460. As the second timing means 128 finishes counting down the block period, the situation can be displayed on the display 120 or transmitted to the automation computer, so as to notify the operator that the block period has been finished. If the block period $T_+>0$, then the receiver 100 will continue blocking the local security system at step 465.

At step 470, the blocking program can request the operator to determine whether the block period should be continued or not. In the case when it is determined that the block period should not be continued, (dialer is fixed) the second timing means 128 is stopped. At the same time, the control section 114 will cause the receiving and transmitting section 116 to stop blocking transmissions. The blocking flag will then be reset to 0, at step 475. In the case when the operator indicates that the block period ($T_+$) should be continued, the blocking program requests the operator to determine whether the block period ($T_+$) should be changed or not, at step 480. If the operator indicates that the block period ($T_+$) is to be changed, the blocking program will prompt the user to input another block time ($T_+$), at step 485. The block time ($T_+$) will be entered the same was as the original block line $T_+$ in step 250.

On the other hand, when the operator decides not to change the block period ($T_+$), the timer is reset. The value of the block period is retrieved from the memory section 110 and the process returns to step 455. The process is then repeated from that step onward and the blocking continues. Alternately, the system can block a call indefinitely. The receiver will block a call until an operator resets the block and allows the call.

The receiver 100 can have a blocking cancellation means. The blocking cancellation means allows the operator to stop the blocking of transmissions from the local security system even if the remaining time left on the second timing means 126 is greater than zero. The blocking cancellation means will send a signal to the control means 114 to reset the blocking flag. The blocking flag will be reset to 0. The second timing means 128 will be stopped.

Figure 4:
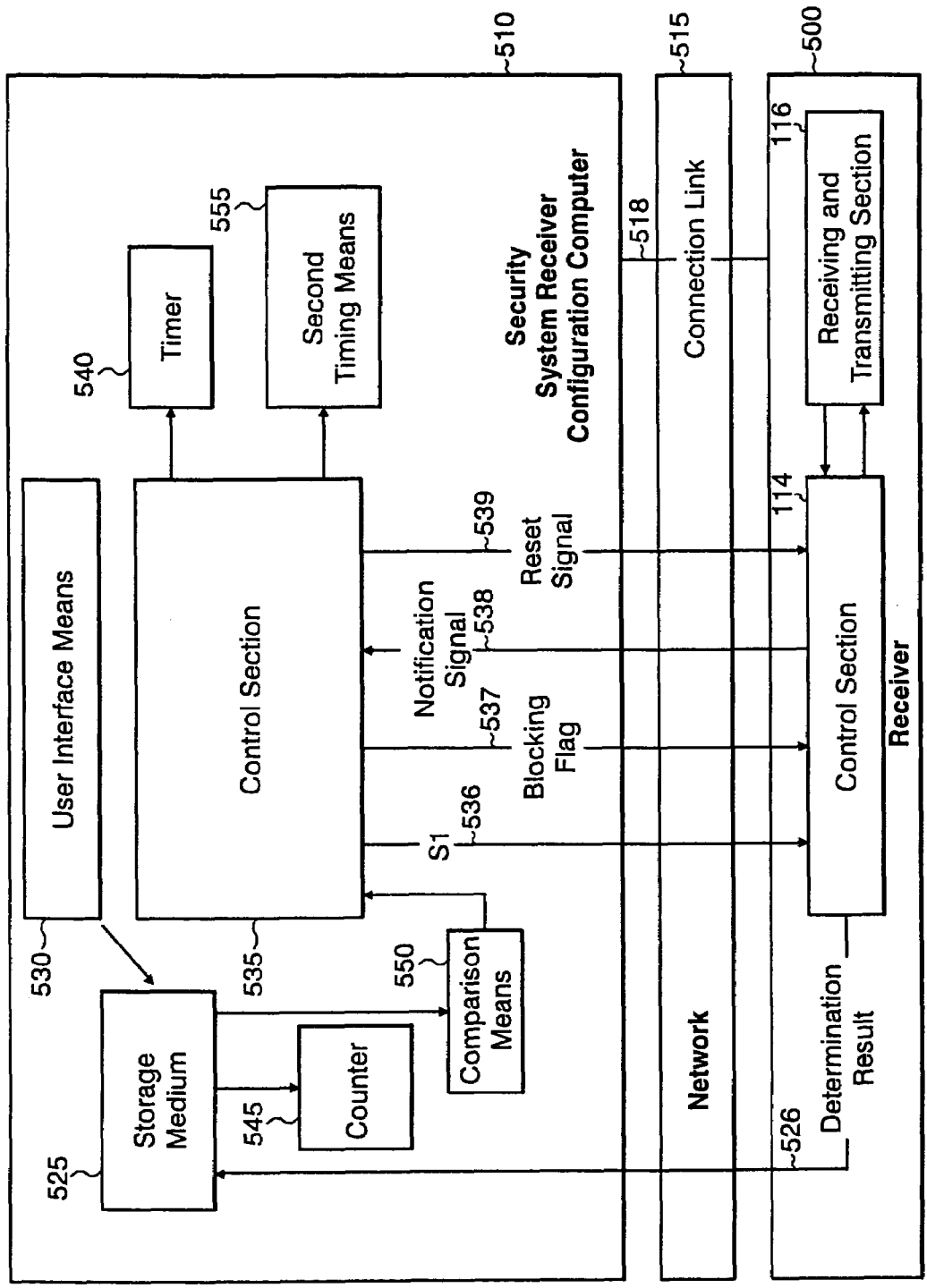
FIG. 4 illustrates a second embodiment of the invention.

FIG. 4 illustrates a second embodiment of the invention. As illustrated in FIG. 4, a security system receiver 500 is connected to a-security system receiver configuration computer 510. The security system receiver 500 is connected to the security system 510 via a network 515. The network 515 can be any network connection such as RS232, RS485 telephone connector, DSL or cable modem, wireless network, radio frequency. The security system receiver configuration computer 515 is typically located at the central monitoring station. The security system receiver 500 is connected to the security system receiver configuration computer 515 by a connection link 518 or Intranet.

The security system receiver configuration computer 510 is connected such that the configuration information can be uploaded to the security system receiver 500.

The security system receiver 500 according to the second embodiment of the invention is similar to the receiver of the first embodiment of the invention, and therefore, will not be described.

In the second embodiment of the invention instead of entering all of the blocking information using a user interface means located on the receiver 100, all of the blocking information and parameters are entered at the security system receiver configuration computer 515 using its interface means 525 which is typically a keyboard. The operator will be able to set a blocking time period, at least one blocking criteria, at least one blocking threshold and a block time using the interface means 525 of the security system receiver configuration computer 510. The blocking program is stored in a storage medium 530 of the receiver configuration computer 515 in this embodiment.

The blocking program will function in a similar manner as in the first embodiment of the invention and will operate at the security system receiver configuration computer 510. The security system receiver 500 will download the blocking parameters from the security system receiver configuration computer 515 such that the security system receiver 500 knows what information to track and send to the security system configuration computer 510.

Figure 5:
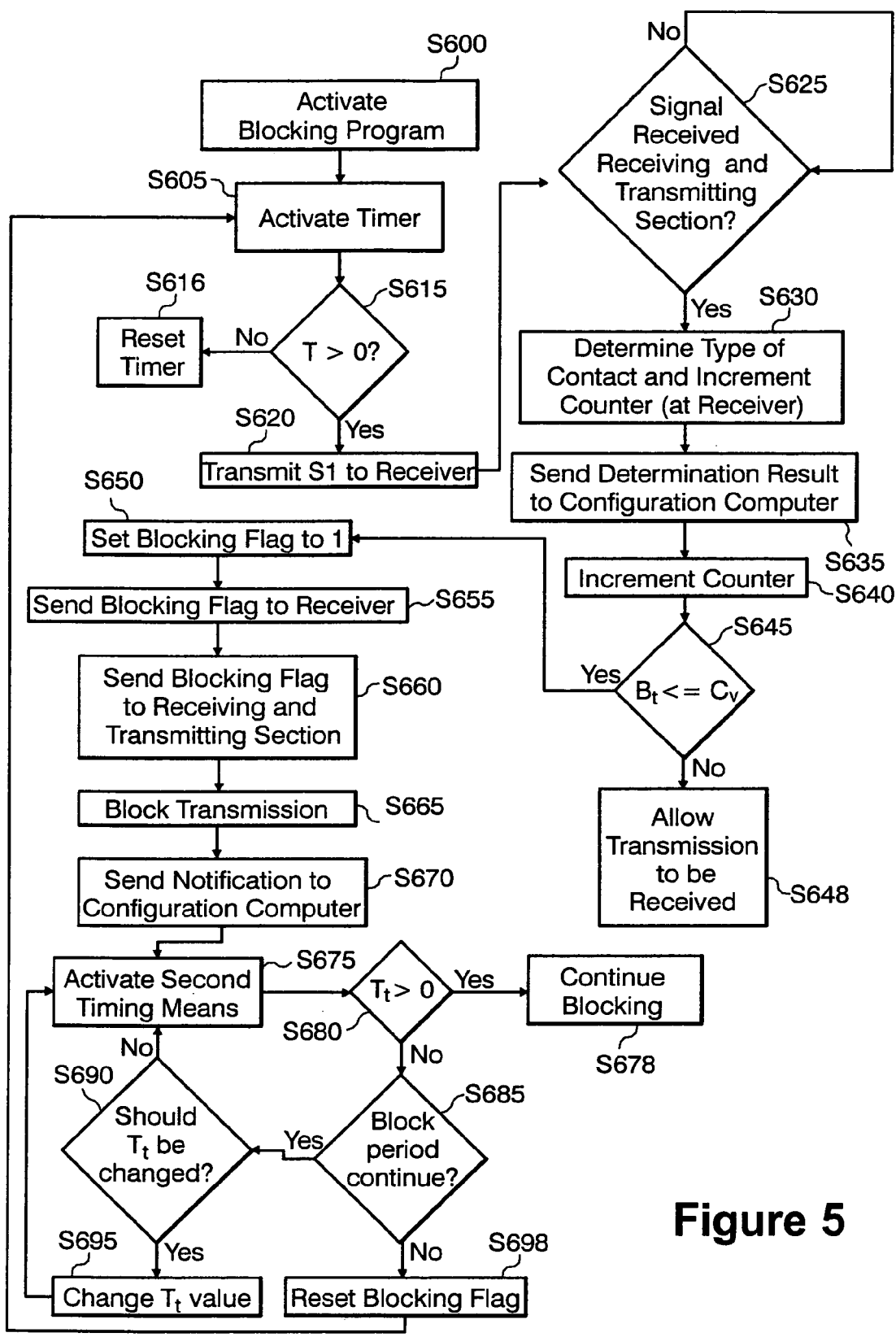
FIG. 5 illustrates the sequence of steps to block a local security system according to the second embodiment of the invention.

Operation of the blocking process according to the second embodiment of the invention will now be described. FIG. 5 illustrates the sequence of steps of blocking a local security system according to the second embodiment of the invention. At step 600 the blocking program is activated. Similar to the preferred embodiment, once all of the blocking information such as blocking criteria, blocking threshold values, blocking time period, block period, and tracking means have been entered, the blocking program instructs a control section 535 to activate a timer 540, at step 605. The timer 540 counts the blocking time period. The timer 540 is located in the monitoring system configuration computer 510, and can be uploaded by the monitoring system receiver.

At step 615, the control section 535 determines if the timer 540 has finished counting down the blocking time period or not. If the timer has not finished counting down the blocking time period (T>0), the control section transmits a signal, (S1) 536 to the monitoring system receiver 500 to instruct the monitoring system receiver 500 to monitor incoming transmission from the local security systems for blocking, at step 620.

The control section 114 at the receiver 500 will check the receiving and transmitting section 116 for a transmission from the local security system, at step 625. If a transmission is detected, then the control section 114 will then determine the type of transmission at step 630. For example, the control section 114 will determine if the transmission was a call or a report.

At step 635, the control section 114 will send to the monitoring system receiver configuration computer 510, the determination result 526. The result will be stored in the storage means 525. Upon receipt of the determination result 526, the blocking program at the security system receiver configuration computer 515 will cause a counter 545 corresponding to the type of transmission, the local security system and the receiver 500, to increment by 1 at step 640.

At step 645, the blocking program will cause the control section 114 to determine if the blocking threshold value has been reached. The blocking program will compare the blocking threshold value with the value of the counter 545. The comparison means 550 will compare the counter value with the blocking threshold value stored in the storage means 525. Step 645 is the same as step 430 in the first embodiment. Similarly if the blocking threshold value ($B_t$) $\leq$ counter value ($C_v$) then the receiver will block the transmission.

At step 650, the blocking program will instruct the control section 535 to set a blocking flag 537 to have a value of 1 if the threshold has been reached. At step 655, the monitoring system receiver configuration computer 515 sends the blocking flag, as a control signal, to the security system receiver 500. The receiver 500, upon receipt of the blocking flag transmits the blocking flag to receiving and transmitting section 116 at step 660. At step 665, the receiving and transmitting section 116 blocks the transmission.

At step 670, the monitoring system receiver 500 sends a notification signal to the monitoring system receiver configuration computer 515 that the local security system is blocking. Upon receipt of this notification signal 538, the blocking program causes a second timing means 535 to start counting down a block period ($t_r$), at step 675. The block period is the predetermined or set by the operator.

The monitoring system receiver 500 will block transmission from the local security system as long as the time remaining in the block period is greater than zero ($T_r$>0), step 678.

At step 680, the blocking program will determine if the second timing means 535 has finished counting the block period or not.

Steps 685, 690 and 695 are the same as step 475, 480 and 485 in the first embodiment.

If the blocking flag is reset to 0, then the monitoring system receiver configuration computer 515 sends a reset signal 539 to the monitoring system receiver 500 to indicate that the receiver should stop blocking the local security system, at step 698. In response to the reset signal the receiver 500 stops blocking the local security system.

It is within the scope of the invention that a plurality of monitoring system receivers are connected to the security system receiver configuration computer. FIG. 4 only shows one monitoring system receiver by way of illustration, however any number of receivers can be used.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for selectively blocking incoming transmissions at a central monitoring station, received from a local security system, the method comprising:
   receiving an incoming transmission from said local security system;
   determining if at least one threshold value corresponding to at least one blocking criteria has been reached; and
   blocking the incoming transmission based upon a result from said determining step for a predetermined block period.

2. The method of claim 1, further comprising the step of:
   setting at least one blocking criteria; and
   setting at least one threshold value for the blocking criteria.

3. The method of claim 2, wherein said blocking criteria includes a number of calls received by a receiver from said local security system within a predetermined time period and said threshold value includes a predetermined number of calls.

4. The method of claim 2, wherein said blocking criteria includes a number of reports received by a receiver from said local security system within a predetermined time period and said threshold value includes a predetermined number of reports.

5. The method of claim 3, wherein said blocking criteria further includes a number of reports received by a receiver from said local security system within a predetermined time period and said threshold value further includes a predetermined number of reports.

6. The method of claim 3, further comprising the step of:
   counting a number of times said local security system calls a receiver.

7. The method of claim 4, further comprising the step of:
   counting a number of times said local security system reports to a receiver.

8. The method of claim 5, further comprising the steps of:
   counting a number of times said local security system calls a receiver; and counting a number of times said local security system reports to a receiver.

9. The method of claims 6, wherein the step of determining if a blocking threshold has been reached further comprising:
comparing a result of the counting step with said threshold value corresponding to said blocking criteria.

10. The method of claims 7, wherein the step of determining if a blocking threshold has been reached further comprising:
comparing a result of the counting step with said threshold value corresponding said blocking criteria.

11. The method of claims 8, wherein the step of determining if a blocking threshold has been reached further comprising:
comparing each result of each of the counting steps with said at least one threshold value corresponding said at least one blocking criteria.

12. The method of claim 9, wherein the step of blocking further includes, the step of:
setting a blocking flag based upon said comparison step.

13. The method of claim 10, wherein the step of blocking further includes, the step of:
setting a blocking flag based upon said comparison step.

14. The method of claim 11, wherein the step of blocking further includes, the step of:
setting a blocking flag based upon said comparison step.

15. The method of claim 1 wherein said predetermined block period is set to a predetermined default value when no block period is inputted.

16. The method of claim 1, further including the step of:
determining a type of said transmission received in said receiving step.

17. The method of claim 1, further comprising the step of:
requesting from an operator a command to determine whether said block period should be continued after a lapse of said block period.

18. The method of claim 17, further comprising the step of:
requesting from an operator a command to determine whether said block period previously set should be changed or not.

19. A monitoring receiver comprising:
a first timer for counting down a blocking time period;
a counter for counting a transmission received from a plurality of local security systems and for generating a count value;
a comparison means for comparing said count value with at least one blocking threshold; and
a blocking means for blocking said transmission from said plurality of local security systems where said count value is greater than at least one blocking threshold during said blocking time period.

20. The monitoring receiver of claim 19, further comprising a means for selecting at least one blocking criteria.

21. The monitoring receiver of claim 19, wherein said blocking means sets a blocking flag when said count value exceeds said at least one blocking threshold.

22. The monitoring receiver of claim 21, wherein said blocking flag is transmitted to receiving and transmitting section which causes said receiving and transmitting section to block the transmission.

23. The monitoring receiver of claim 19, further comprising a means for selecting said at least one blocking threshold.

24. The monitoring receiver of claim 19, further comprising a second timing means for counting down a block period which is a time wherein said security receiver blocks transmissions from said plurality of local security systems.

25. A monitoring system comprising:
a plurality of receivers each having a receiving and transmitting section for receiving and transmitting transmissions from and to a plurality of local security systems and a control section for processing said transmissions;
a monitoring system configuration computer connected to said plurality of receivers, said monitoring system configuration computer includes;
a first timer for counting down a blocking time period;
a counter for counting a number of transmissions received by each of said plurality of receivers from one of said plurality of local security system;
a comparison means for comparing said number with at least one blocking threshold which is stored in a storage medium; and
a control section for transmitting a blocking signal to one of said plurality of receivers based upon said comparison.

26. The monitoring system of claim 25, wherein said monitoring system configuration computer further includes a means for selecting at least one blocking criteria, at least one blocking threshold, a blocking time period and a block period.

27. The monitoring system of claim 25, wherein said one of said plurality of receivers blocks said transmissions from one of said plurality of local security system when said one of said plurality of receivers receives the blocking signal from said monitoring system receiver configuration computer.

* * * * *